(12) United States Patent
Cheng

(10) Patent No.: US 10,265,652 B1
(45) Date of Patent: Apr. 23, 2019

(54) BUCKLE MECHANISM OF DUST COLLECTING BARREL OF BAG-TYPE DUST COLLECTOR

(71) Applicant: SAN FORD MACHINERY CO., LTD., Taichung (TW)

(72) Inventor: Yuan-Tai Cheng, Taichung (TW)

(73) Assignee: SAN FORD MACHINERY CO., LTD., Taichung (TW)

( * ) Notice: Subject to any disclaimer, the term of this patent is extended or adjusted under 35 U.S.C. 154(b) by 0 days.

(21) Appl. No.: 15/806,859

(22) Filed: Nov. 8, 2017

(51) Int. Cl.
| | |
|---|---|
| *A47K 1/08* | (2006.01) |
| *B01D 46/42* | (2006.01) |
| *B01D 46/04* | (2006.01) |
| *F16M 13/02* | (2006.01) |
| *F16B 2/18* | (2006.01) |

(52) U.S. Cl.
CPC .......... *B01D 46/4227* (2013.01); *B01D 46/04* (2013.01); *F16B 2/185* (2013.01); *F16M 13/02* (2013.01)

(58) Field of Classification Search
USPC ........................................................ 248/313
See application file for complete search history.

(56) References Cited

U.S. PATENT DOCUMENTS

| | | | | |
|---|---|---|---|---|
| 8,147,580 | B2 * | 4/2012 | Lin ...................... | B03C 3/017 220/200 |
| 8,377,160 | B2 * | 2/2013 | Witter .................. | B01D 46/42 55/322 |
| 9,566,592 | B1 * | 2/2017 | Cheng ................ | B04C 5/185 |
| 9,744,538 | B2 * | 8/2017 | Anderson ........... | B04C 5/185 |
| 2012/0297569 | A1 * | 11/2012 | Cheng ................ | B01D 46/42 15/257.01 |

* cited by examiner

*Primary Examiner* — Monica E Millner
(74) *Attorney, Agent, or Firm* — Ming Chow; Sinorica, LLC

(57) ABSTRACT

A buckle mechanism of a dust collecting barrel of a bag-type dust collector includes a first retaining seat and a second retaining seat. Two sides of the first retaining seat are provided with two first linking members. Two sides of the second retaining seat are provided with two second linking members. The first linking members and the second linking members are connected through two connecting rods. An operating rod is provided between the second linking members. A support unit is provided between the first linking members. The support unit is fixed to a barrel cover. The second linking members are driven to swing by the operating rod and the first linking members are linked so that the barrel cover is moved up and down to quickly complete the assembly and disassembly of a dust collecting barrel.

8 Claims, 6 Drawing Sheets

BUCKLE MECHANISM OF DUST COLLECTING BARREL OF BAG-TYPE DUST COLLECTOR

FIELD OF THE INVENTION

The present invention relates to a dust collector, and more particularly, to a buckle mechanism which can assist a user in assembling and disassembling a dust collecting barrel of a bag-type dust collector.

BACKGROUND OF THE INVENTION

A bag-type dust collector is often used to collect and filter dust in the air to maintain the air quality of the environment. The bag-type dust collector comprises a machine stand. The machine stand is provided with an air bellows. One end of the air bellows is provided with an air inlet. The bottom of the air bellows is provided with two first air outlets. The top of the air bellows is provided with a plurality of second air outlets corresponding to the first air outlets. An air blower is provided, corresponding in position to the air inlet. The first air outlet is provided with a dust collecting bag. A fastening ring is provided on the outer peripheral side of the first air outlet. The dust collecting bag is tightened by the fastening ring so that the dust collecting bag is fixed to the first air outlet. The second air outlets are provided with a plurality of filter bags, respectively. The filter bags can be used to filter the dust in the air, so that when the air blower is activated, the air with dust in the environment is sucked from the air inlet to the air bellows. Through the inertia and gravity, the heavy dust falls to the dust collecting bag, the light dust flows along with the air flow to the filter bags to be adsorbed to the filter bags, and the air is returned to the environment through the filter bags.

After a period of time, the dust collecting bag needs to be cleaned or replaced due to dust accumulation. Therefore, when the user wants to replace the dust collecting bag, the fastening ring is loosened to disengage the dust collecting bag from the first air outlet for replacing the dust collecting bag. A clean dust collecting bag is fitted to the first air outlet, and then the fastening ring is fitted to the first air outlet and the dust collecting bag. Finally, the fastening ring is tightened to secure the dust collecting bag. However, the dust collecting bag must be tightly fitted to the first air outlet. The user often spends a lot of time and needs a sufficient space to replace the dust collecting bag. The replacement of the dust collecting bag is complicated, resulting in inconvenience to the user. Accordingly, the inventor of the present invention has devoted himself based on his many years of practical experiences to solve these problems.

SUMMARY OF THE INVENTION

The primary object of the present invention is to provide a buckle mechanism which can assist the user in assembling and disassembling a dust collecting barrel of a bag-type collector quickly and conveniently.

In order to achieve the aforesaid object, a buckle mechanism of a dust collecting barrel of a bag-type dust collector is provided. The dust collector comprises a machine stand. The machine stand is provided with an air bellows therein. The air bellows has an air inlet. A bottom of the air bellows is provided with at least one first air outlet. A top of the air bellows is provided with a plurality of second air outlets corresponding to the first air outlet. A telescopic tube is connected to one end of the first air outlet, another end of the telescopic tube being connected with a barrel cover, the dust collecting barrel being provided under the barrel cover, the second air outlets being provided with filter bags respectively, the bottom of the air bellows being provided with an air blower, the buckle mechanism being disposed on the dust collector and connected with the barrel cover. The buckle mechanism comprises a first retaining seat, a second retaining seat, two first linking members, two second linking members, two connecting rods, and a support unit. The first retaining seat is disposed at a bottom of the machine stand close to the second air outlets. Two sides of the first retaining seat have first pivot ends, respectively. The second retaining seat is fixed to one side of the first retaining seat. Two sides of the second retaining seat have second pivot ends, respectively. The two first linking members each have a first pivot portion at a central portion thereof. The first pivot portions of the two first linking members are pivotally connected to the first pivot ends of the first retaining seat. The two first linking members each have one end formed with a first connecting end and another end formed with a second connecting end. The two second linking members each have a second pivot portion at a central portion thereof. The second pivot portions of the two second linking members are pivotally connected to the second pivot ends of the second retaining seat. The two second linking members each have one end formed with a connecting end and another end connected with an operating rod. The two connecting rods each have a first end and a second end. The first end is connected to the first connecting end of a corresponding one of the first linking members. The second end is connected to the second connecting end of a corresponding one of the second linking members.

The support unit is disposed on the barrel cover and pivotally connected between the first linking members. The support unit includes a support member. The support member has a central through hole for the telescopic tube to pass therethrough. The support member is provided with a plurality of limit holes around an outer periphery of the through hole. Each of the limit holes is provided with a limit rod. The fixing rod is sleeved with an elastic member. The elastic member is located between the barrel cover and the support member.

According to the buckle mechanism of the dust collecting barrel of the bag-type dust collector of the present invention, the operating rod is pulled up, and the dust collecting barrel is pushed to be under the barrel cover. Then, the operating rod is pressed downward. The second linking members and the connecting rods are in parallel to each other, and the first linking members and the connecting rods are in a dead center state due to a toggle effect. The operating rod can be retained after the user releases the operating rod for the barrel cover to cover the dust collecting barrel tightly, thereby completing the installation of the dust collecting barrel. The buckle mechanism can assist the user in assembling and disassembling the dust collecting barrel quickly and conveniently to improve the working efficiency greatly.

DETAILED DESCRIPTION OF THE PREFERRED EMBODIMENTS

Embodiments of the present invention will now be described, by way of example only, with reference to the accompanying drawings.

Figure 1:
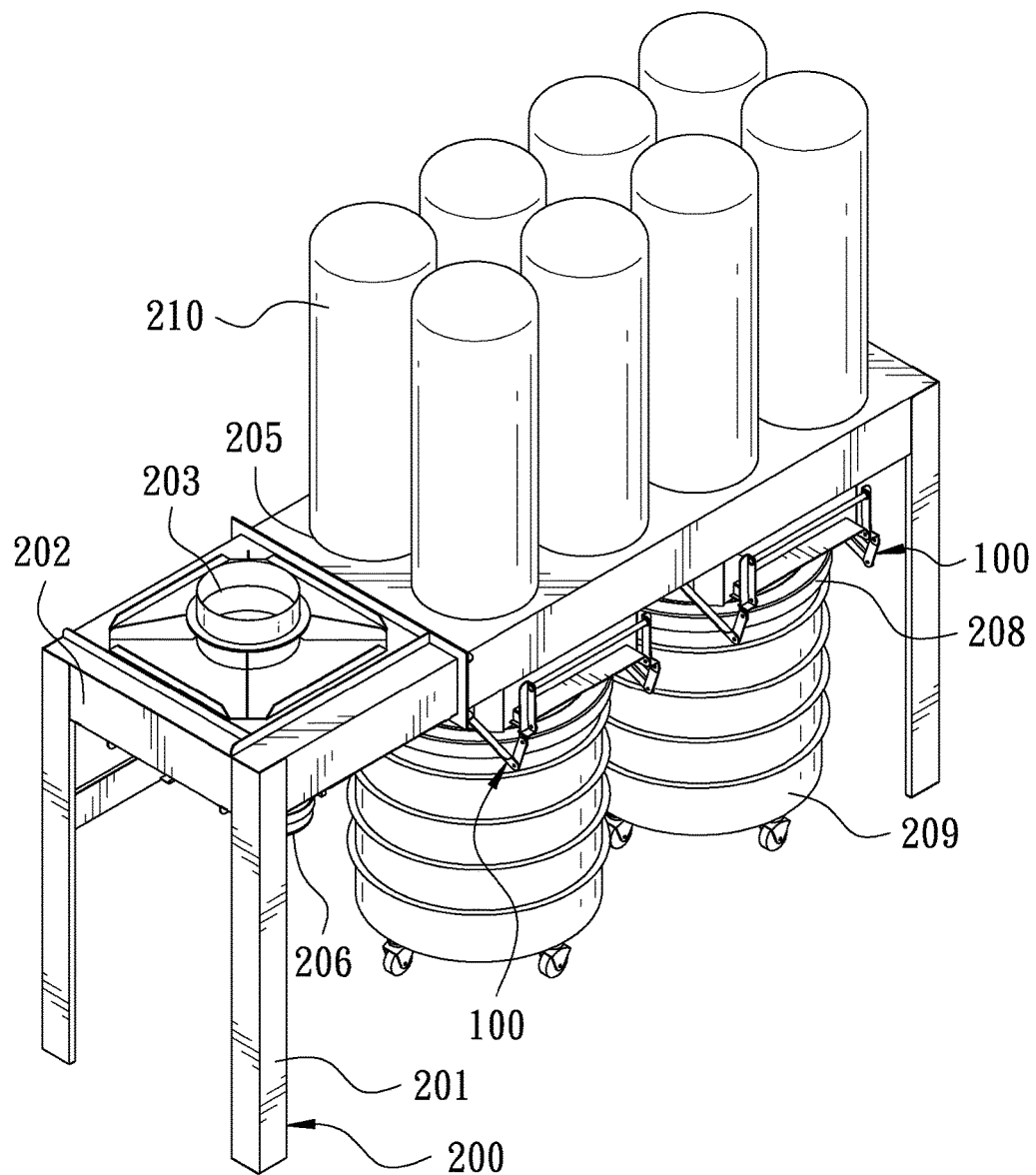
FIG. 1 is a perspective view in accordance with a preferred embodiment of the present invention.
Figure 2:
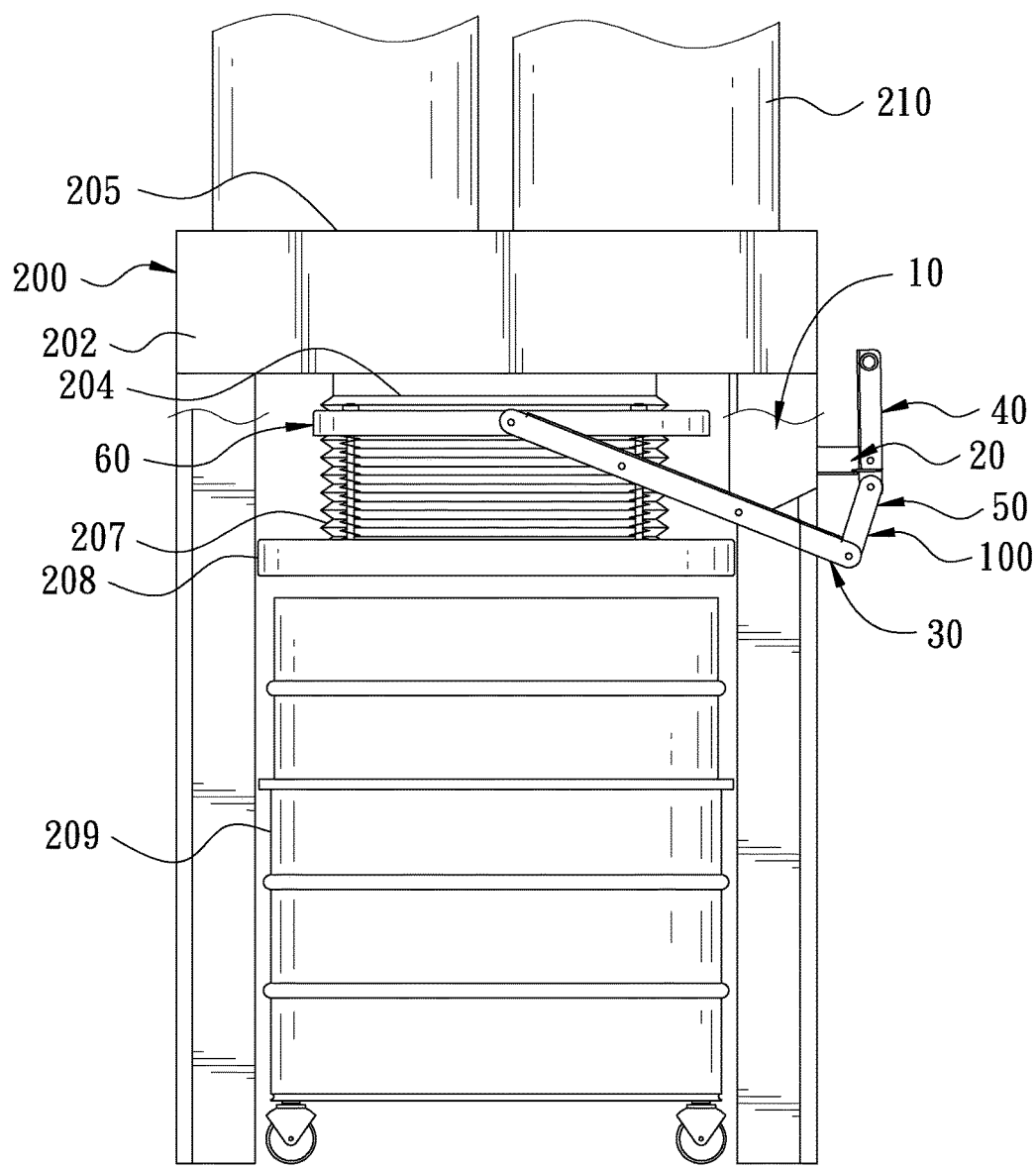
FIG. 2 is a side view in accordance with the preferred embodiment of the present invention.
Figure 3:
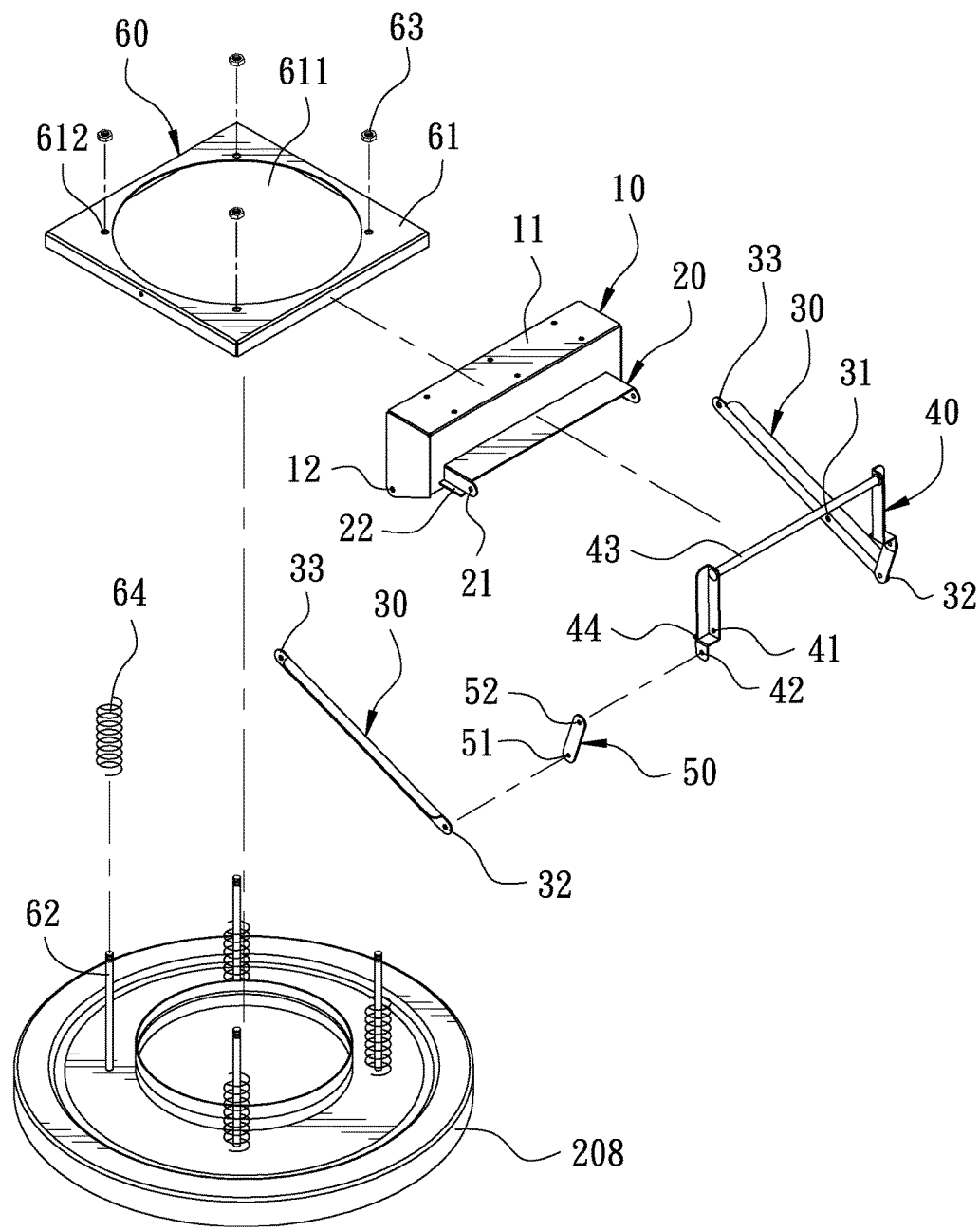
FIG. 3 is an exploded view of the buckle mechanism in accordance with the preferred embodiment of the present invention.

Referring to FIG. 1 to FIG. 3, the present invention discloses a buckle mechanism of a dust collecting barrel of a bag-type dust collector. The dust collector 200 comprises a machine stand 201. One end of the top of the machine stand 201 is provided with an air bellows 202. The air bellows 202 has an air inlet 203, two first air outlets 204, and a plurality of second air outlets 205 located above the first air outlets 204. The air bellows 202 is provided with an air blower 206 close to the air inlet 203. A telescopic tube 207 is connected to one end of the first air outlet 204. Another end of the telescopic tube 207 is fixedly connected with a barrel cover 208 to cover a dust collecting barrel 209. The buckle mechanism 100 is disposed on the machine stand 201 and is located at one side of the machine stand 201 close to the first air outlet 204. Another end of the buckle mechanism 100 is connected to the barrel cover 208. The second air outlets 205 are provided with filter bags 210, respectively. The buckle mechanism 100 comprises a first retaining seat 10, a second retaining seat 20, two first linking members 30, two second linking members 40, two connecting rods 50, and a support unit 60.

The first retaining seat 10 is disposed below the air bellows 202 of the machine stand 201 and is located close to the second air outlets 205. The top of the first retaining seat 10 has a retaining portion 11 for the first retaining seat 10 to be fixed below the air bellows 202. Two sides of the first retaining seat 10 have first pivot ends 12, respectively.

The second retaining seat 20 is fixed to one side of the first retaining seat 10. Two sides of the second retaining seat 20 have second pivot ends 21, respectively. The bottom edges of the two sides of the second retaining seat 20 have engaging portions 22 extending outward, respectively.

The two first linking members 30 each have a first pivot portion 31 at a central portion thereof. The first pivot portions 31 of the two first linking members 30 are pivotally connected to the first pivot ends 12 of the first retaining seat 10. The two first linking members 30 each have one end formed with a first connecting end 32 and another end formed with a second connecting end 33.

The two second linking members 40 each have a second pivot portion 41 at a central portion thereof. The second pivot portions 41 of the two second linking members 40 are pivotally connected to the second pivot ends 21 of the second retaining seat 20. The two second linking members 40 each have one end formed with a connecting end 42 and another end connected with an operating rod 43. The two second linking members 40 each have a holding portion 44 close to the second pivot portion 41.

The two connecting rods 50 each have a first end 51 and a second end 52. The first end 51 is connected to the first connecting end 32 of a corresponding one of the first linking members 30. The second end 52 is connected to the second connecting end 42 of a corresponding one of the second linking members 40.

The support unit 60 is disposed on the barrel cover 208. The support unit 60 includes a support member 61. The support member 61 is a rectangular plate body. The support member 61 has a central through hole 611 for the telescopic tube 207 to pass therethrough. Two sides of the support member 61 are pivotally connected to the second connecting ends 32 of the first linking members 30. The support member 61 is provided with a plurality of limit holes 612 around the outer periphery of the through hole 611. In the embodiment of the present invention, the support member 61 is provided with four limit holes 612 around the outer periphery of the through hole 611. Each of the limit holes 612 is provided with a limit rod 62. One end of the limit rod 62 is fixed to the barrel cover 208. The other end of the fixing rod 62 is provided with a limit member 63. In this embodiment of the present invention, the limit member 63 is a nut. The limit member 63 is threadedly connected to the fixing rod 62. The fixing rod 62 is sleeved with an elastic member 64. The elastic member 64 is located between the barrel cover 208 and the support member 61. In this embodiment of the present invention, the elastic member 64 is a spring.

Figure 4:
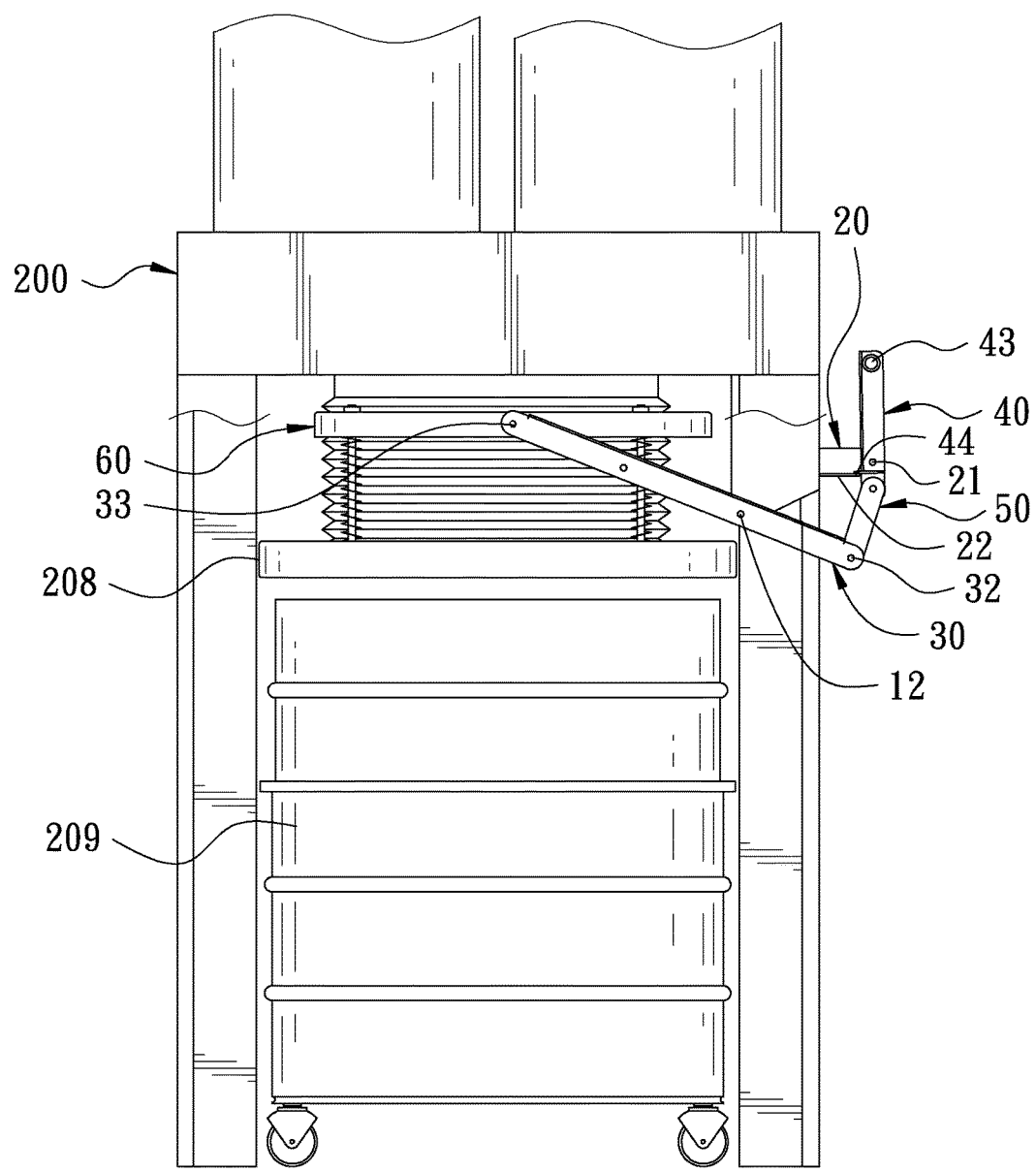
FIG. 4 is a schematic view in accordance with the preferred embodiment of the present invention when in use.
Figure 5:
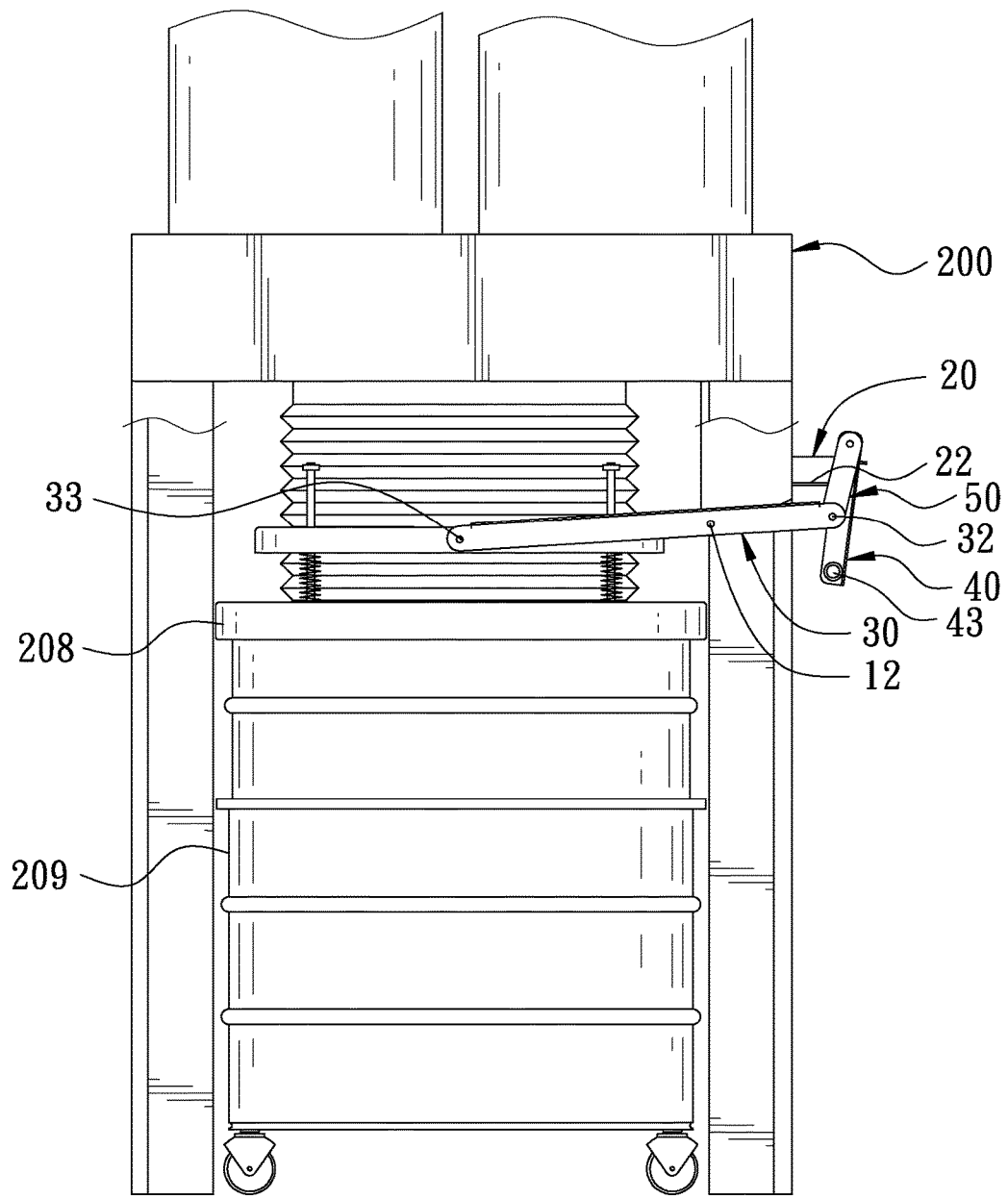
FIG. 5 is another schematic view in accordance with the preferred embodiment of the present invention when in use.

Referring to FIG. 4 and FIG. 5, when the user wants to use the dust collector 200, the operating rod 43 is first pulled up, and the second linking members 40 corresponds to the second pivot ends 21 as a center fulcrum so that the second linking members 40 are pivoted corresponding to the second pivot ends 21. The holding portions 44 of the second linking members 40 hold against the engaging portions 22 of the second retaining seat 20, so that the second linking members 40 stops running. The support unit 60 lifts the barrel cover 80 upward so that the dust collecting barrel 209 can be pushed into the dust collector 200. Then, the dust collecting barrel 209 is pushed into the dust collector 200 and located below the barrel cover 208. The operating rod 43 is pulled downward for the second linking members 40 to pivot relative to the second pivot ends 21. The first linking members 30 are driven to swing by the connecting rods 50. The first linking members 30 use the first pivot ends 12 of the first retaining seat 10 as the central fulcrum so that the respective two ends of the first linking members 30 are swung up and down to form a seesaw effect. Therefore, when the first connecting ends 32 of the first linking members 30 are swung upward by the connecting rods 50, the second connecting ends 33 of the first linking members 30 are pressed downward. The respective sides of the second linking members 40 hold against the engaging portions 22 of the second fixing seat 20, such that the first linking members 30 and the second linking members 40 stop turning, meanwhile, the second linking members 40 and the connecting rods 50 are in parallel to each other to form a toggle effect. The first linking members 30, the second linking members 40 and the connecting rods 50 are in a dead center state. The operating rod 43 can be retained after the user releases the operating rod 43 for the barrel cover 208 to cover the dust collecting barrel 209 tightly, thereby completing the installation of the dust collecting barrel 209.

Figure 6:
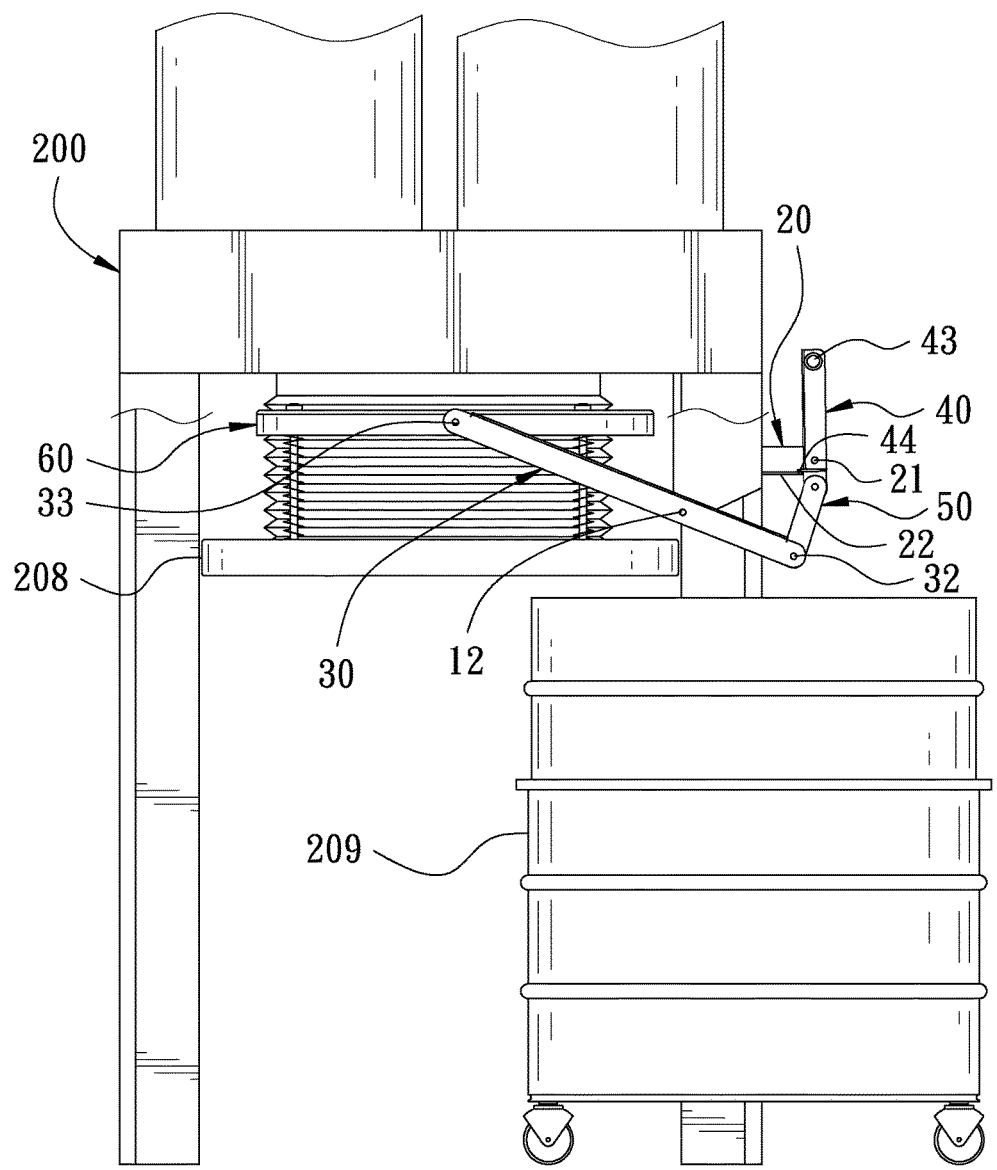
FIG. 6 is a schematic view of replacing the dust collecting barrel in accordance with the preferred embodiment of the present invention.

As shown in FIG. 6, after the dust collector 200 is used for a period of time and the user wants to replace the dust collecting barrel 209, the operating rod 43 is pulled up. The connecting rods 50 and the second linking members 40 release the dead center state so that the second linking members 40 drive the first linking members 30 to swing. When the holding portions 44 of the second linking members 40 hold against the engaging portions 22 of the second retaining seat 20, the connecting rods 50 are perpendicular to the first linking members 30, and the connecting rods 50 and the first linking members 30 are in a dead center state. Therefore, the operating rod 43 can be retained after the user releases the operating rod 43 for the user to replace or clean the dust collecting barrel 209. The buckle mechanism 100 assists the user in installing the dust collecting barrel 209 quickly and easily, thereby greatly improving the working efficiency.

It is to be noted that the position of the operating rod 43 is suitable for the user to operate the buckle mechanism 100 in a standing state. Therefore, the user can easily pull the operating rod 43 without bending or squatting.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A buckle mechanism of a dust collecting barrel of a bag-type dust collector, the dust collector comprising a machine stand, the machine stand being provided with an air bellows therein, the air bellows having an air inlet, a bottom of the air bellows being provided with at least one first air outlet, a top of the air bellows being provided with a plurality of second air outlets corresponding to the first air outlet, a telescopic tube being connected to one end of the first air outlet, another end of the telescopic tube being connected with a barrel cover, the dust collecting barrel being provided under the barrel cover, the second air outlets being provided with filter bags respectively, the bottom of the air bellows being provided with an air blower, the buckle mechanism being disposed on the dust collector and connected with the barrel cover, the buckle mechanism comprising:

a first retaining seat, disposed at a bottom of the machine stand close to the second air outlets, two sides of the first retaining seat having first pivot ends respectively;

a second retaining seat, fixed to one side of the first retaining seat, two sides of the second retaining seat having second pivot ends respectively;

two first linking members, each having a first pivot portion at a central portion thereof, the first pivot portions of the two first linking members being pivotally connected to the first pivot ends of the first retaining seat, the two first linking members each having one end formed with a first connecting end and another end formed with a second connecting end;

two second linking members, each having a second pivot portion at a central portion thereof, the second pivot portions of the two second linking members being pivotally connected to the second pivot ends of the second retaining seat, the two second linking members each having one end formed with a connecting end and another end connected with an operating rod;

two connecting rods, each having a first end and a second end, the first end being connected to the first connecting end of a corresponding one of the first linking members, the second end being connected to the second connecting end of a corresponding one of the second linking members;

a support unit, disposed on the barrel cover and pivotally connected between the first linking members, the support unit including a support member, the support member having a central through hole for the telescopic tube to pass therethrough, the support member being provided with a plurality of limit holes around an outer periphery of the through hole, each of the limit holes being provided with a limit rod, the fixing rod being sleeved with an elastic member, the elastic member being located between the barrel cover and the support member.

2. The buckle mechanism of the dust collecting barrel of the bag-type dust collector as claimed in claim 1, wherein a top of the first retaining seat has a retaining portion for the first retaining seat to be fixed below the air bellows.

3. The buckle mechanism of the dust collecting barrel of the bag-type dust collector as claimed in claim 1, wherein bottom edges of the two sides of the second retaining seat have engaging portions extending outward, respectively.

4. The buckle mechanism of the dust collecting barrel of the bag-type dust collector as claimed in claim 1, wherein the second linking members each have a holding portion close to the second pivot portion.

5. The buckle mechanism of the dust collecting barrel of the bag-type dust collector as claimed in claim 1, wherein the support member is a rectangular plate body.

6. The buckle mechanism of the dust collecting barrel of the bag-type dust collector as claimed in claim 1, wherein one end of the limit rod is fixed to the barrel cover, and another end of the limit rod is provided with a limit member for limiting the support member and the elastic member.

7. The buckle mechanism of the dust collecting barrel of the bag-type dust collector as claimed in claim 6, wherein the limit member is a nut.

8. The buckle mechanism of the dust collecting barrel of the bag-type dust collector as claimed in claim 1, wherein the elastic member is a spring.

* * * * *